March 5, 1957 — J. BAUMGARTEN — 2,783,978

ENGINE-HOOD-CONSTRUCTION FOR AUTOMOBILES

Filed Oct. 30, 1953 — 2 Sheets-Sheet 1

Inventor
Jochem Baumgarten
By A. C. Jones
Attorney

March 5, 1957 J. BAUMGARTEN 2,783,978
ENGINE-HOOD-CONSTRUCTION FOR AUTOMOBILES
Filed Oct. 30, 1953 2 Sheets-Sheet 2
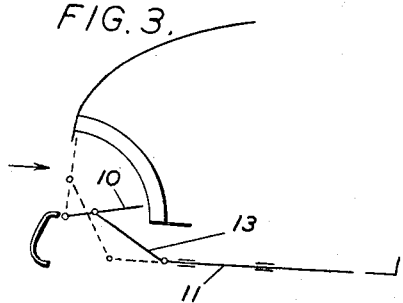
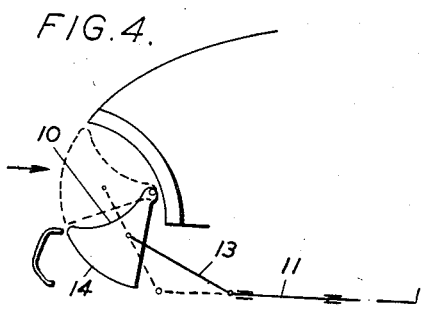
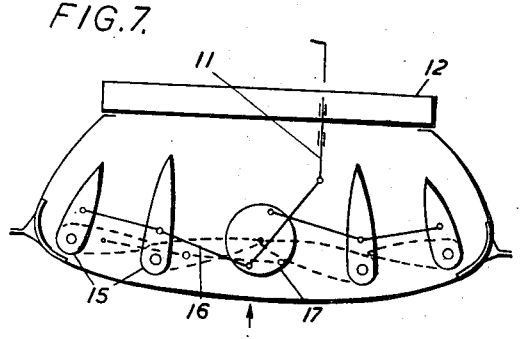
Inventor
Jochem Baumgarten
By
Attorney

United States Patent Office 2,783,978
Patented Mar. 5, 1957

2,783,978

ENGINE-HOOD-CONSTRUCTION FOR AUTOMOBILES

Jochem Baumgarten, Russelsheim am Main, Hessen, Germany, assignor to General Motors Corporation, Detroit, Mich., a corporation of Delaware Application October 30, 1953, Serial No. 389,447

1 Claim. (Cl. 257—132)

This invention relates to an arrangement for regulating the quantity of engine-cooling air in automobiles in which the engine hood comprises an air-intake opening extending over substantially the width of the vehicle, with the radiator spaced away from the plane of said opening.

Well known already are arrangements which bring about a selective regulation of the quantity of engine cooling air by means of radiator shutters, but little use has been made of these systems owing to their more or less complicated construction. In general, where regulation of the water temperature has been desired it has been preferably in the water system itself, this method being cheaper and more convenient from a production point of view, for example by using a thermostat to throttle the stream of water flowing through the radiator. Even these arrangements however did not fully meet the requirements made; proof of which is the fact that in cold weather automobile owners find it necessary to fit radiator blinds or muffs in front of their radiators.

Moreover, the known arrangements for regulating the supply of cooling air or the effective radiator area are not suitable for vehicles having an air intake opening extending substantially over the width of the vehicle.

It is an object of the present invention to provide a means for regulating the cooling water temperature in such vehicles by controlling the quantity of air delivered. This may be done by arranging baffles, air-guiding plates, shutters or the like, in such a way that they deliver to the radiator situated behind the front casing of the vehicle only that quantity of air which is necessary at any time for regulating the operating temperature of the engine— preferably keeping it constant.

The air shutter or shutters bounding the air intake opening are made pivotable and adjustable preferably in such a way that they are able to close the opening completely. In the case of a single shutter pivotable about a horizontal axis, this shutter may be such that when closed it merges into the aesthetic line of the hood. The inlet opening may, as an alternative have a plurality of shutters pivotable about a vertical axis, and which are preferably of a "stream-lined" sectional shape, to suit the airflow.

An advantage of the invention is that it is possible to raise the temperature level under the engine hood and the troublesome chilling of certain sensitive spots is avoided. In particular, somewhat warmed air is delivered to the carburetor instead of the cold air outside.

Furthermore the invention makes it possible, in many operating conditions, to lower the energy loss for ventilating the radiator.

The arrangement of the shutters is preferably such that they disturb the air flow conditions at the front of the vehicle as little as possible. In the main, the arrangement will be such that the intake opening will be small or even closed during the cold weather, at which time no power need be taken from the engine for air-cooling the radiator. In warm weather on the other hand the intake aperture is large or completely open.

The accompanying drawings illustrate two embodiments of the invention by way of example. In the drawings:

Fig. 3 is a schematic vertical section in the longitudinal direction of the vehicle through the air intake opening according to Figs. 1 and 2;

Fig. 4 is a schematic section in the longitudinal direction of the vehicle through the air intake opening the air shutter in this case having a different cross-sectional shape from Fig. 3;

Fig. 7 represents a schematic horizontal section through the air intake opening according to Figs. 5 and 6.

Figs. 3, 4 and 7 indicate, diagrammatically, possible arrangements of the air shutter or shutters, which may be actuated manually, or may be actuated automatically in accordance with the engine operating temperature.

10 denotes a single adjustable shutter in the air intake extending over the entire width of the vehicle. The shutter 10 can close the air intake opening completely and is pivotally mounted about a horizontal axis at its lower edge in two bearing (not shown).

The use of a single adjustable air shutter 10 as indicated in Figs. 1 to 4 has the advantage that the bearing points are reduced to a minimum so that the arrangement is cheapened.

Figure 1:
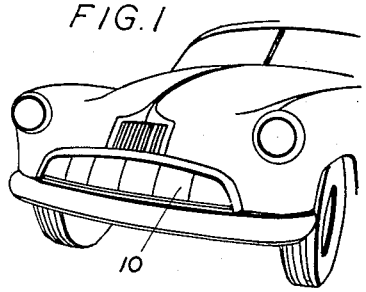
Fig. 1 is a perspective front view of a passenger automobile with an air intake opening extending over the width of the car and with a single adjustable air shutter (shown in the closed position) fitted therein.
Figure 2:
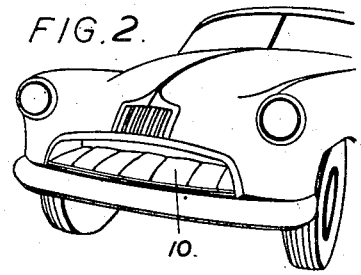
Fig. 2 shows the air intake opening of Fig. 1 with the air shutter open.
Figure 5:
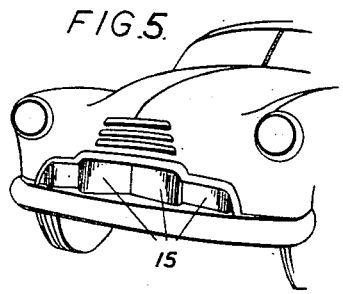
Fig. 5 is a perspective front view of a vehicle with an air intake opening extending over the width of the vehicle and having therein several air directing vanes or shutters, shown in the closed position.
Figure 6:
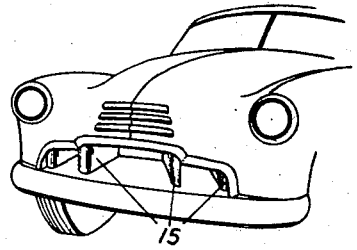
Fig. 6 shows the air intake opening of Fig. 5 in which the vanes or shutters are in the open position.

Besides certain advantages purely from the point of view of shape, the arrangement shown in Figs. 5 to 7 offers the possibility of an efficient cooling of the radiator.

Fig. 3 illustrates schematically the adjustment of the air shutter 10 by means of a linkage 11 and lever 13.

In the modification according to Fig. 4 the shutter 10 has its edge faired and the faired portion 14 is so shaped that in the closed position it conforms to the line of the outer shell. The baffle 10 is swung about its turning axis by means of the linkage 11 and lever 13.

In Figs. 5 and 6 the air intake is fitted with vanes or shutters 15 which are appropriately stream-lined in profile and are pivoted about a vertical axis. They are turned by means of a linkage 16 actuated either by hand, or automatically in accordance with the operating temperature of the engine. The air intake opening can be completely closed, by means of the shutters 15, as shown in Fig. 5.

In Fig. 7, 12 denotes the radiator and 11 the linkage for turning the disc 17 to which the rods 16 are articulated.

While the embodiments of the present invention as herein disclosed constitute preferred forms, it is to be understood that other forms might be adopted within the scope of the appended claim.

I claim:

In combination with a vehicle, a radiator mounted adjacent the front end thereof, a streamlined hood on said vehicle extending forwardly and downwardly in front of said radiator and forming a streamlined deflector to deflect oncoming air in a stream upwardly over said vehicle when the vehicle is in motion, said hood having a forwardly facing air inlet opening to admit air to said radiator, a single shutter within said opening and of substantially the same extent thereof to control the passage of air therethrough to said radiator, and means pivotally mounting said shutter within said opening for swinging movement about the lower edge thereof between open and closed positions, whereby said shutter merges smoothly into the forwardly and downwardly extending hood and substantially closes said opening in the closed position thereof and is located inwardly of said opening and entirely out of the path of said air stream in the open position thereof.

References Cited in the file of this patent

UNITED STATES PATENTS

| | | |
|---|---|---|
| 1,228,765 | Fekete | June 5, 1917 |
| 1,392,521 | Pate | Oct. 4, 1921 |
| 1,409,698 | Galli | Mar. 14, 1922 |
| 1,448,012 | Tregoning | Mar. 13, 1923 |
| 1,492,437 | Dowell | Apr. 29, 1924 |
| 1,560,901 | Duryea | Nov. 10, 1925 |